(12) United States Patent
Kwon et al.

(10) Patent No.: US 8,658,720 B2
(45) Date of Patent: *Feb. 25, 2014

(54) THERMOPLASTIC RESIN COMPOSITION WITH IMPROVED COMPATIBILITY

(75) Inventors: Kee Hae Kwon, Gunpo-si (KR); Il Jin Kim, Ansan-si (KR); Hyung Rang Moon, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,209

(22) Filed: Sep. 13, 2010

(65) Prior Publication Data

US 2011/0040019 A1 Feb. 17, 2011

Related U.S. Application Data

(63) Continuation-in-part of application No. PCT/KR2008/007825, filed on Dec. 31, 2008.

(30) Foreign Application Priority Data

Mar. 13, 2008 (KR) ........................ 10-2008-0023412

(51) Int. Cl.
*C08L 69/00* (2006.01)

(52) U.S. Cl.
USPC ............................ 524/146; 524/502; 525/185

(58) Field of Classification Search
USPC ........................................................ 524/146
See application file for complete search history.

(56) References Cited

U.S. PATENT DOCUMENTS

| | | | |
|---|---|---|---|
| 3,322,853 A | 5/1967 | Trementozzi et al. | |
| 3,839,513 A | 10/1974 | Patel | |
| 3,898,300 A | 8/1975 | Hillard | |
| 4,027,073 A | 5/1977 | Clark | |
| 4,045,514 A | 8/1977 | Iwahashi et al. | |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,303,772 A | 12/1981 | Novicky | |
| 4,391,935 A | 7/1983 | Bialous et al. | |
| 4,400,333 A | 8/1983 | Neefe | |
| 4,632,946 A | 12/1986 | Muench et al. | |
| 4,634,734 A | 1/1987 | Hambrecht et al. | |
| 4,692,488 A | 9/1987 | Kress et al. | |
| 4,745,029 A | 5/1988 | Kambour | |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,061,558 A | 10/1991 | Fischer et al. | |
| 5,061,745 A | 10/1991 | Wittmann et al. | |
| 5,200,492 A | 4/1993 | Ohnaga et al. | |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A | 7/1993 | Wroczynski | |
| 5,239,001 A | 8/1993 | Fischer et al. | |
| 5,274,031 A | 12/1993 | Eichenauer et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,306,778 A | 4/1994 | Ishida et al. | |
| 5,449,557 A | 9/1995 | Liebler et al. | |
| 5,451,650 A | 9/1995 | Siol et al. | |
| 5,473,019 A | 12/1995 | Siol et al. | |
| 5,605,962 A | 2/1997 | Suzuki et al. | |
| 5,627,228 A | 5/1997 | Kobayashi | |
| 5,643,981 A | 7/1997 | Yang et al. | |
| 5,672,645 A | 9/1997 | Eckel et al. | |
| 5,731,390 A | 3/1998 | van Helmond et al. | |
| 5,750,602 A | 5/1998 | Kohler et al. | |
| 5,833,886 A | 11/1998 | Dashevsky et al. | |
| 5,905,122 A | 5/1999 | Ohtsuka et al. | |
| 5,955,184 A | 9/1999 | Honda et al. | |
| 6,022,917 A | 2/2000 | Kobayashi | |
| 6,063,889 A | 5/2000 | Friebe et al. | |
| 6,083,428 A | 7/2000 | Ueda et al. | |
| 6,111,024 A | 8/2000 | McKee et al. | |
| 6,127,465 A | 10/2000 | Nodera | |
| 6,174,945 B1 | 1/2001 | Kim et al. | |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

Machine translation of JP 2006-2572184.*
International Search Report in counterpart International Application No. PCT/KR2008/07825 dated Aug. 28, 2009.
International Search Report in commonly owned International Application No. PCT/KR2008/007820 dated Jul. 28, 2009, pp. 1-2.
European Search Report in counterpart European Application No. 08873329.0 dated Dec. 14, 2012, pp. 1-7.
Japanese Office Action in commonly owned Japanese Application No. 2010-539284, dated Sep. 11, 2012, pp. 1-3.
Mark, Physical Properties of Polymers Handbook, 2nd Edition, Polymer Research Center and Department of Chemistry, University of Cincinnati, OH, (2007) Springer, pp. 5-7.

(Continued)

*Primary Examiner* — Doris Lee
(74) *Attorney, Agent, or Firm* — Additon, Higgins, Pendleton & Ashe, P.A.

(57) ABSTRACT

Disclosed herein is a thermoplastic resin composition that can have improved compatibility by introducing a branched acrylic copolymer to a polycarbonate resin. The thermoplastic resin composition can have good scratch resistance in addition to good colorability and appearance without requiring the addition of a compatibilizer.

14 Claims, 4 Drawing Sheets

(56) References Cited

U.S. PATENT DOCUMENTS

| | | | |
|---|---|---|---|
| 6,252,002 B1 * | 6/2001 | Yamada et al. | 525/228 |
| 6,337,371 B2 | 1/2002 | Kurata et al. | |
| 6,369,141 B1 | 4/2002 | Ishii et al. | |
| 6,380,304 B1 | 4/2002 | Vanspeybroeck et al. | |
| 6,437,029 B1 | 8/2002 | Lim et al. | |
| 6,528,559 B1 | 3/2003 | Nakacho et al. | |
| 6,528,561 B1 | 3/2003 | Zobel et al. | |
| 6,566,428 B1 | 5/2003 | Ecket et al. | |
| 6,576,161 B2 | 6/2003 | Lim et al. | |
| 6,596,794 B1 | 7/2003 | Ecket et al. | |
| 6,596,893 B2 | 7/2003 | Nakacho et al. | |
| 6,613,822 B1 | 9/2003 | Eckel et al. | |
| 6,613,824 B2 | 9/2003 | Campbell et al. | |
| 6,630,524 B1 | 10/2003 | Lim et al. | |
| 6,646,068 B2 * | 11/2003 | Chisholm et al. | 526/90 |
| 6,686,404 B1 | 2/2004 | Eckel et al. | |
| 6,716,900 B2 | 4/2004 | Jang et al. | |
| 6,762,228 B2 | 7/2004 | Seidel et al. | |
| 6,849,689 B2 | 2/2005 | Yamada et al. | |
| 6,890,979 B2 | 5/2005 | Eichenauer et al. | |
| 6,914,089 B2 | 7/2005 | Eckel et al. | |
| 6,956,072 B1 | 10/2005 | Kanaka et al. | |
| 7,001,944 B2 | 2/2006 | Vathauer et al. | |
| 7,067,188 B1 | 6/2006 | Yang et al. | |
| 7,094,818 B2 | 8/2006 | Lim et al. | |
| 7,294,659 B2 | 11/2007 | Yatake | |
| 7,511,088 B2 | 3/2009 | Lim et al. | |
| 7,550,523 B2 | 6/2009 | Lim et al. | |
| 7,659,332 B2 | 2/2010 | Kang et al. | |
| 7,732,515 B2 | 6/2010 | Jang et al. | |
| 7,767,738 B2 | 8/2010 | Gaggar et al. | |
| 7,956,127 B2 | 6/2011 | Lee et al. | |
| 8,119,726 B2 | 2/2012 | Lim et al. | |
| 8,304,494 B2 | 11/2012 | Park et al. | |
| 2001/0009946 A1 | 7/2001 | Catsman et al. | |
| 2002/0042483 A1 | 4/2002 | Vanderbilt | |
| 2002/0115759 A1 | 8/2002 | Eckel et al. | |
| 2002/0151624 A1 | 10/2002 | Kobayashi | |
| 2003/0139504 A1 | 7/2003 | Miebach et al. | |
| 2004/0013882 A1 | 1/2004 | Gorny et al. | |
| 2004/0122139 A1 | 6/2004 | Yang et al. | |
| 2004/0192814 A1 | 9/2004 | Yang et al. | |
| 2004/0198877 A1 | 10/2004 | Yang et al. | |
| 2004/0249027 A1 | 12/2004 | Lim et al. | |
| 2004/0249070 A1 | 12/2004 | Lim et al. | |
| 2005/0159533 A1 | 7/2005 | Nabeshima et al. | |
| 2005/0245648 A1 | 11/2005 | Lim et al. | |
| 2006/0004154 A1 * | 1/2006 | DeRudder et al. | 525/469 |
| 2006/0014863 A1 | 1/2006 | Lim et al. | |
| 2006/0030647 A1 | 2/2006 | Ebeling et al. | |
| 2006/0100307 A1 | 5/2006 | Uerz et al. | |
| 2007/0155873 A1 | 7/2007 | Kang et al. | |
| 2007/0249767 A1 | 10/2007 | Kang et al. | |
| 2007/0249768 A1 | 10/2007 | Hong et al. | |
| 2007/0287799 A1 | 12/2007 | Ha et al. | |
| 2007/0295946 A1 | 12/2007 | Lim et al. | |
| 2008/0182926 A1 | 7/2008 | Lim et al. | |
| 2009/0054568 A1 | 2/2009 | Uejima et al. | |
| 2009/0080079 A1 | 3/2009 | Kogure et al. | |
| 2009/0093583 A1 | 4/2009 | Kawato et al. | |
| 2009/0118402 A1 | 5/2009 | Jang et al. | |
| 2010/0029855 A1 | 2/2010 | Matsuoka et al. | |
| 2010/0152357 A1 | 6/2010 | Kwon et al. | |
| 2010/0168272 A1 | 7/2010 | Park et al. | |
| 2010/0240831 A1 | 9/2010 | Kim et al. | |
| 2010/0256288 A1 | 10/2010 | Kim et al. | |
| 2011/0009524 A1 | 1/2011 | Kwon et al. | |
| 2011/0021677 A1 | 1/2011 | Kwon et al. | |
| 2011/0160377 A1 | 6/2011 | Chung et al. | |
| 2011/0160380 A1 | 6/2011 | Kwon et al. | |

FOREIGN PATENT DOCUMENTS

| | | |
|---|---|---|
| CN | 101061179 A | 10/2007 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1209163 A1 | 5/2002 |
| EP | 2204412 A1 | 7/2010 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-316580 A | 11/2001 |
| JP | 2002-080676 | 3/2002 |
| JP | 2002-348457 A | 12/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 * | 9/2006 |
| JP | 2006-257284 A | 9/2006 |
| JP | 2006-342246 A | 12/2006 |
| JP | 2007-023227 A | 2/2007 |
| JP | 2008-292853 A | 12/2008 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-0079118 A | 9/2004 |
| KR | 10-0648114 B1 | 11/2006 |
| KR | 10-0767428 B1 | 10/2007 |
| KR | 885819 B1 | 2/2009 |
| KR | 10-902352 A | 6/2009 |

(56) References Cited

FOREIGN PATENT DOCUMENTS

| | | |
|---|---|---|
| WO | 99 19383 A1 | 4/1999 |
| WO | 99/57198 A1 | 11/1999 |
| WO | 00/18844 A1 | 4/2000 |
| WO | 00 00544 A1 | 1/2001 |
| WO | 01/66634 A | 9/2001 |
| WO | 00 09518 A1 | 2/2002 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 A1 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |

OTHER PUBLICATIONS

Polysciences, Inc., data sheet for benzyl acrylate, no date, pp. 1-2.
Guidechem, data sheet for RUBA-93, no date, pp. 1-2.
Office Action in commonly owned U.S. Appl. No. 12/972,795 mailed Jan. 18, 2013, pp. 1-9.
International Search Report in commonly owned International Application No. PCT/KR2008/007157 dated May 28, 2009, pp. 1-2.
Office Action in commonly owned U.S. Appl. No. 12/792,176 mailed Nov. 16, 2011, pp. 1-12.
Chinese Office Action in commonly owned Chinese Application No. 201010597679.9 dated Aug. 27, 2012, pp. 1-5.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.
Advisory Action in commonly owned U.S. Appl. No. 12/961,877 mailed Mar. 12, 2013, pp. 1-2.
Office Action in commonly owned U.S. Appl. No. 12/961,877 mailed Jul. 30, 2012, pp. 1-14.
Office Action in commonly owned U.S. Appl. No. 12/642,904 mailed Mar. 27, 2012, pp. 1-7.
Office Action in commonly owned U.S. Appl. No. 12/817,302 mailed Mar. 29, 2012, pp. 1-5.
Office Action in commonly owned U.S. Appl. No. 12/971,333 mailed Aug. 27, 2012, pp. 1-12.
Final Office Action in commonly owned U.S. Appl. No. 12/971,333 mailed Dec. 10, 2012, pp. 1-11.
Notice of Allowance in commonly owned U.S. Appl. No. 12/971,333 mailed Jun. 27, 2013, pp. 1-9.
Office Action in commonly owned U.S. Appl. No. 12/971,333 mailed Jul. 11, 2013, pp. 1-7.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-9.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Notice of Allowance in commonly owned U.S. Appl. No. 12/642,904 mailed Jul. 2, 2012, pp. 1-8.
European Search Report for commonly owned European Application No. EP 04808586, completed on Sep. 25, 2007.
Chinese Office Action in counterpart Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
Advisory Action in commonly owned U.S. Appl. No. 12/631,018 mailed Nov. 7, 2012, pp. 1-3.
Final Office Action in commonly owned U.S. Appl. No. 12/817,302 mailed Feb. 7, 2013, pp. 1-6.
Final Office Action in commonly owned U.S. Appl. No. 12/888,549 mailed Dec. 18, 2012, pp. 1-7.
Notice of Allowance in commonly owned U.S. Appl. No. 12/884,549 mailed Apr. 11, 2013, pp. 1-8.
European Search Report in commonly owned European Application No. 07024808, dated Mar. 18, 2008, pp. 1-2.
Machine Translation of JP 10-017762.
Derwent Abstract of JP 2002348457 (A) (2003).
Full English Translation of JP-10-017762 (2011).
Advisory Action in commonly owned U.S. Appl. No. 12/817,302 mailed May 16, 2013, pp. 1-5.
Office Action in commonly owned U.S. Appl. No. 12/898,012 mailed Dec. 21, 2012, pp. 1-6.
Notice of Allowance in commonly owned U.S. Appl. No. 12/972,795 mailed May 24, 2013, pp. 1-8.
Search Report in commonly owned European Patent Application No. EP 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.

* cited by examiner

THERMOPLASTIC RESIN COMPOSITION WITH IMPROVED COMPATIBILITY

CROSS-REFERENCE TO RELATED APPLICATIONS

This application is a continuation-in-part of International Application No. PCT/KR2008/007825, filed Dec. 31, 2008, pending, which designates the U.S., published as WO 2009/113762, and is incorporated herein by reference in its entirety, and claims priority therefrom under 35 USC Section 120. This application also claims priority under 35 USC Section 119 from Korean Patent Application No. 10-2008-0023412, filed Mar. 13, 2008, in the Korean Intellectual Property Office, the entire disclosure of which is also incorporated herein by reference.

FIELD OF THE INVENTION

The present invention relates to a thermoplastic resin composition that can have improved compatibility.

BACKGROUND OF THE INVENTION

Generally, thermoplastic resins have lower specific gravity than glasses and metals and can have good physical properties such as moldability and impact resistance. However, many thermoplastic resins can have poor surface scratch resistance.

For example, polycarbonate resins can have excellent mechanical strength, flame retardancy, transparency, and weatherability, in addition to good impact resistance, thermal stability, self-extinguishing property, and dimensional stability. Polycarbonate resins accordingly have been widely used in electrical and electronic products and parts of automobiles. Although polycarbonate resins can be a substitute for products including conventional glasses that require both transparency and impact resistance, polycarbonate resins generally havepoor scratch resistance.

In contrast, polymethylmethacrylate resins can have good transparency, weatherability, mechanical strength, surface gloss, adhesive strength, and excellent scratch resistance. Polymethylmethacrylate resins, however, may not have adequate impact resistance and flame retardancy for various applications.

Conventionally a hard coating method has been used to improve the scratch resistance of plastic products. The hard coating method can include the steps of coating a surface of an injection-molded resin with an organic-inorganic hybrid material and curing the organic-inorganic hybrid material on the surface of the resin using heat or ultra violet light. However, the hard coating method requires an additional coating step, which can increase processing times and manufacturing costs and it may cause environmental problems. With recent increased interest in environmental protection and reduction of manufacturing costs, there is a need for a non-coated resin which has scratch resistance without using the hard coating method. Also, it is important to develop a resin with good scratch resistance for the housing manufacturing industry.

One attempt to improve scratch resistance of thermoplastic resins alloys acrylic resin such as polymethylmethacrylate with good scratch resistance with polycarbonate resin. However, it can be difficult to obtain high transparency and colorability using this method due to the difference between the refractive indices of the polycarbonate resin and the acrylic resin.

Korean Patent Publication Laid-open No. 2004-0079118 discloses a method of lowering the molecular weight of polycarbonate during a kneading process using metal stearic acid ester in order to improve the compatibility between a polycarbonate resin and a methacrylate resin. However, the blend of the polycarbonate and the methacrylate resin can have significantly reduced mechanical properties.

U.S. Pat. No. 4,287,315 discloses a methacrylate resin with good impact strength using an ethylene-vinyl acetate rubber. A blend of polycarbonate and the methacrylate resin, however, can have low transparency.

SUMMARY OF THE INVENTION

The present inventors have developed a thermoplastic resin composition that can have good scratch resistance as well as high transparency and high colorability. The thermoplastic resin composition of the invention includes a branched (meth)acrylic copolymer resin with a high refractive index, which can be blended with a polycarbonate resin to improve the compatibility of the resins and to reduce the difference between the refractive indices of the polycarbonate resin and the (meth)acrylic resin. The thermoplastic resin composition of the invention can be useful in various applications including parts of electrical and electronic appliances, parts of automobiles, lenses, window glasses, and the like, due to its good scratch resistance, high colorability, and high transparency.

The present invention further provides a molded article produced from the thermoplastic resin composition.

Other aspects, features and advantages of the present invention will be apparent from the ensuing disclosure and appended claims.

The thermoplastic resin composition of the present invention comprises (A) about 20 or more but less than about 100% by weight of a polycarbonate resin; and (B) more than about 0 but not more than about 80% by weight of a branched (meth)acrylic copolymer resin.

In an exemplary embodiment, the thermoplastic resin composition may comprise (A) about 40 to about 90% by weight of a polycarbonate resin; and (B) about 10 to about 60% by weight of a branched (meth)acrylic copolymer resin.

In an exemplary embodiment, the branched (meth)acrylic copolymer resin (B) may have a weight average molecular weight of about 100,000 to about 3,500,000. In another exemplary embodiment, the methacrylic copolymer resin (B) may have a weight average molecular weight of about 500,000 to about 3,000,000. In another exemplary embodiment, the methacrylic copolymer resin (B) may have a weight average molecular weight of about 1,000,000 to about 2,500,000.

Further, the branched (meth)acrylic copolymer resin (B) may have a refractive index of about 1.495 to about 1.575. In an exemplary embodiment, the refractive index may be about 1.50 to about 1.575, or about 1.51 to about 1.575.

The branched (meth)acrylic copolymer resin (B) may be a copolymer of (b1) an aromatic methacrylate, an aliphatic methacrylate, or a mixture thereof, and (b3) a branch-inducing monomer, or a mixture of copolymers thereof. In an exemplary embodiment, the branched (meth)acrylic copolymer resin (B) may further comprise a mono-functional unsaturated monomer.

In an exemplary embodiment, the branched (meth)acrylic copolymer resin (B) may be a copolymer of about 5 to about 99.999% by weight of the aromatic methacrylate, aliphatic methacrylate, or a mixture thereof (b1), about 0 to about 85% by weight of the mono-functional unsaturated monomer (b2), and about 0.001 to about 10% by weight of the branch-inducing monomer, or a mixture of copolymers thereof.

In another exemplary embodiment, the thermoplastic resin composition may further comprise (C) more than about 0 but less than about 80% by weight of a (meth)acrylic resin.

In another embodiment, the thermoplastic resin composition may further comprise about 10 to about 30% by weight of a (meth)acrylic resin. In another embodiment, the thermoplastic resin composition may further comprise about 30 to about 60% by weight of a (meth)acrylic resin. The (meth) acrylic resin (C) may have a linear structure.

In an exemplary embodiment, the (meth)acrylic resin (C) is a homopolymer of a (meth)acrylic monomer, a copolymer of two or more (meth)acrylic monomers, or a mixture thereof.

The thermoplastic resin composition of the present invention may optionally further comprise one or more additives selected from the group consisting of flame retardants, antimicrobials, releasing agents, thermal stabilizers, antioxidants, light stabilizers, compatibilizer, dyes, inorganic fillers, surfactants, nucleating agents, coupling agents, fillers, plasticizers, impact modifiers, coloring agents, stabilizers, lubricants, antistatic agents, pigments, flameproof agents, and mixtures thereof.

In an exemplary embodiment, the thermoplastic resin composition may have a complex viscosity ($\eta^*$) of about 1,000 Pas to about 10,000 Pas at 240° C. and 0.1 rad/s. In another exemplary embodiment, the thermoplastic resin composition may have a complex viscosity ($\eta^*$) of about 1,000 Pas to about 5,000 Pas at 240° C. and 0.1 rad/s. In another embodiment, the complex viscosity may be about 5,500 Pas to about 10,000 Pas. Furthermore, at 240° C., the ratio of $\eta^*(0.1\ \text{rad/s})/\eta^*(100\ \text{rad/s})$ may range from about 3.0 to about 100.0. In an exemplary embodiment, the ratio of $\eta^*(0.1\ \text{rad/s})/\eta^*(100\ \text{rad/s})$ may range from about 3.5 to about 30.0. In another exemplary embodiment, the ratio of $\eta^*(0.1\ \text{rad/s})/\eta^*(100\ \text{rad/s})$ may range from about 30.0 to about 75.0. In another exemplary embodiment, the ratio of $\eta^*(0.1\ \text{rad/s})/\eta^*(100\ \text{rad/s})$ may range from about 75.0 to about 100.0.

The present invention provides a molded article produced from the foregoing thermoplastic resin composition. The present invention now will be described more fully hereinafter in the following detailed description of the invention.

BRIEF DESCRIPTION OF THE DRAWINGS

FIG. 1(*a*) is a scratch profile of a specimen prepared in Example 2 and FIG. 1(*b*) is a scratch profile of a specimen prepared in Comparative Example 3.

FIG. 2(*a*) is a transmission electron microscope (TEM) image of a specimen prepared in Example 2 and FIG. 2(*b*) is a transmission electron microscope (TEM) image of a specimen prepared in Comparative Example 2.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin of the present invention may be prepared by any conventional method well known to those skilled in the art. For example, the polycarbonate resin may be prepared by reacting dihydric phenol compound with phosgene in the presence of a catalyst and a molecular weight controlling agent. Also, the polycarbonate resin may be prepared by transesterification of a carbonate precursor such as dihydric phenol compound and diphenylcarbonate.

The dihydric phenol compound may be a bisphenol compound, such as 2,2-bis(4-hydroxyphenyl)propane (bisphenol A). The bisphenol A may be partially or totally substituted with another dihydric phenol. In addition to bisphenol A, other examples of dihydric phenols may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, and the like, as well as halogenated bisphenol such as 2,2-bis(3,5-dibromo-4-hyroxyphenyl)propane, and mixtures thereof.

However, the dihydric phenol compound applicable for preparing the polycarbonate resin is not limited to the aforementioned compounds.

The polycarbonate resin used in the present invention may be a homopolymer, a copolymer of two or more types of dihydric phenols, or a mixture thereof.

Examples of polycarbonate resin useful in the present invention may also include, without limitation, linear polycarbonate resin, branched polycarbonate resin, polyester carbonate copolymer resin and the like, and mixtures thereof.

Exemplary linear polycarbonate resins include, without limitation, bisphenol A-based polycarbonate resins. Exemplary branched polycarbonate resins may be prepared, without limitation, by reacting one or more poly-functional aromatic compounds such as trimelitic anhydride, trimelitic acid and the like, with one or more dihydric phenol compounds and carbonate precursors. Exemplary polyester carbonate copolymer resins may also be prepared, without limitation, by reacting di-functional carboxylic acid with one or more dihydric phenol compounds and carbonate precursors. The linear polycarbonate resin, the branched polycarbonate resin and the polyester carbonate copolymer resin can be used alone or in combination with one another.

According to the present invention, the thermoplastic resin composition may include the polycarbonate resin in an amount of about 20% by weight or more but less than about 100% by weight, for example about 40 to about 90% by weight. If the amount of polycarbonate is less than about 20% by weight, it can be difficult to obtain good mechanical properties in the polycarbonate resin. Exemplary compositions of the invention having good scratch resistance can include about 45 to about 80% by weight of the polycarbonate resin.

In some embodiments, the thermoplastic resin composition may include the polycarbonate resin in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight, or higher so long as the composition does not include 100% by weight polycarbonate resin (i.e., another component is present in the composition). Further, according to some embodiments of the present invention, the amount of the polycarbonate resin can be in a range from about any of the foregoing amounts to about any other of the foregoing amounts.

(B) Branched (Meth)Acrylic Copolymer Resin

The branched (meth)acrylic copolymer resin of the present invention may be a copolymer of (b1) an aromatic methacrylate, an aliphatic methacrylate, or a mixture thereof, and (b3) a branch-inducing monomer, or a mixture of copolymers thereof. The branched (meth)acrylic copolymer resin may have a branched structure with partial crosslinking. In an exemplary embodiment, the branched (meth)acrylic copolymer resin may further comprise (b2) a mono-functional unsaturated monomer.

In an exemplary embodiment, the branched (meth)acrylic copolymer resin of the present invention may be prepared by polymerizing a monomer mixture comprising (b1) about 5 to about 99.999% by weight of an aromatic methacrylate, an aliphatic methacrylate, or a mixture thereof, (b2) about 0 to about 85% by weight of a mono-functional unsaturated monomer, and (b3) about 0.001 to about 10% by weight of a branch-inducing monomer.

In some embodiments, the branched (meth)acrylic copolymer resin of the present invention may be prepared by polymerizing a monomer mixture comprising (b1) about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.999% by weight of an aromatic methacrylate, an aliphatic methacrylate, or a mixture thereof. Further, according to some embodiments of the present invention, the amount of the aromatic methacrylate, aliphatic methacrylate, or mixture thereof, can be in a range from about any of the foregoing amounts to about any other of the foregoing amounts.

The aromatic or aliphatic methacrylate (b1) may have a hydrocarbon group having 6 to 20 carbon atoms, and may be represented by the following Chemical Formula 1, Chemical Formula 2, or a mixture thereof.

[Chemical Formula 1]

wherein m is an integer from 0 to 10, and X comprises a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group.

[Chemical Formula 2]

wherein m is an integer from 0 to 10, Y is oxygen (O) or sulfur (S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Exemplary aromatic methacrylates and aliphatic methacrylates (b1) may include, but are not limited to, cyclohexyl methacrylate, phenoxy methacrylate, phenoxyethyl methacrylate, 2-ethylthiophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, and 2-(4-benzylphenyl)ethyl methacrylate, and the like. They may be used alone or in combination with one another.

The aromatic or aliphatic methacrylate (b1) may be used in an amount of about 5 to about 99.999% by weight, for example about 20 to about 99% by weight, and as another example about 45 to about 90% by weight, based on the total weight of the monomer mixture. If the amount of the aromatic or aliphatic methacrylate (b1) is less than about 5% by weight, the average refractive index of polymerized (meth)acrylic copolymer may be lowered to less than 1.495.

Exemplary mono-functional unsaturated monomers (b2) may include, but are not limited to, methacrylic acid ester monomers including methyl methacrylate, ethyl methacrylate, n-propyl methacrylate, n-butyl methacrylate, hexyl methacrylate, and 2-ethylhexyl methacrylate; acrylic acid ester monomers including methyl acrylate, ethyl acrylate, propyl acrylate, butyl acrylate, hexyl acrylate, and 2-ethyl hexyl acrylate; unsaturated carboxylic acid monomers including acrylic acid and methacrylic acid; acid anhydride monomers including maleic anhydride; hydroxyl group containing ester monomers including 2-hydroxyethyl acrylate, 2-hydroxypropyl acrylate, and monoglycerol acrylate; and the like; and mixtures thereof.

The branched (meth)acrylic copolymer resin may optionally comprise the mono-functional unsaturated monomer (b2). The mono-functional unsaturated monomer (b2) may be used in an amount of about 85% by weight or less, for example about 1 to about 70% by weight, and as another example about 10 to about 60% by weight, based on the total weight of the monomer mixture.

In some embodiments, the mono-functional unsaturated monomer (b2) may not be present (0% by weight). In some embodiments, the mono-functional unsaturated monomer (b2) may be present, i.e., the branched (meth)acrylic copolymer resin of the present invention may include the mono-functional unsaturated monomer (b2) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the mono-functional unsaturated monomer (b2) can be in a range from about any of the foregoing amounts to about any other of the foregoing amounts.

Exemplary branch-inducing monomers (b3) may include, but are not limited to, silicone-containing branch-inducing monomers having a vinyl functional group, ester-containing branch-inducing monomers, aromatic branch-inducing monomers, and the like. These monomers may be used alone or in combination with one another. The number of the functional groups of the branch-inducing monomer may be from 1 to 4. A branched copolymer having ultra-high molecular weight with partial crosslinking may be prepared by using the branch-inducing monomers having such functional groups.

Examples of the branch-inducing monomer (b3) may include without limitation silane or siloxane compounds, aromatic crosslinking monomers, vinyl group-containing monomers, allyl compounds, polyalkylene glycol di(meth)acrylate compounds, and the like, and mixtures thereof.

Specific examples of the branch-inducing monomer (b3) may include without limitation silane or siloxane compounds including unsaturated hydrocarbon group-containing silicone-containing crosslinking monomers such as divinyl tetramethyl disiloxane, and tetramethyl tetravinyl cyclotetrasiloxane; aromatic crosslinking monomers including divinylbenzene; vinyl group-containing monomers including 1,4-divinyloxybutane and divinylsulfone; allyl compounds including diallyl phthalate, diallylacrylamide, triallyl (iso)cyanurate, and triallyl trimelitate; and (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate, and the like. They may be used alone or in combination with one another.

The branch-inducing monomer (b3) may be used in an amount of about 0.001 to about 10% by weight, for example about 0.01 to about 7% by weight, and as another example about 0.1 to about 5% by weight. In some embodiments, the branched (meth)acrylic copolymer resin may include the branch-inducing monomer (b3) in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10% by weight. Further, according to some embodiments of the present invention, the amount of the branch-inducing monomer (b3) can be in a range from about any of the foregoing amounts to about any other of the foregoing amounts.

If the amount of the branch-inducing monomer (b3) is less than about 0.001% by weight, an ultra-high molecular weight branched structure may not be obtained, and if the amount of the branch-inducing monomer (b3) is more than about 10% by weight, processability and compatibility with a polycarbonate resin may decrease.

The branched (meth)acrylic copolymer resin (B) may be prepared by conventional methods such as bulk polymerization, emulsion polymerization, and suspension polymerization.

The branched (meth)acrylic copolymer resin (B) may have a higher refractive index than conventional acrylic copolymers. Conventional polycarbonates have a refractive index of about 1.590 and polymethylmethacrylates have a refractive index of about 1.490. The branched (meth)acrylic copolymer resin of the present invention can have a refractive index in between, that is, from about 1.495 to about 1.575. In some embodiments, the branched (meth)acrylic copolymer resin may have a refractive index of about 1.50 to about 1.575, or about 1.51 to about 1.575.

Furthermore, the branched (meth)acrylic copolymer may have a weight average molecular weight of about 100,000 to about 3,500,000. In an exemplary embodiment, the branched (meth)acrylic copolymer may have a weight average molecular weight of about 500,000 to about 3,000,000. In another exemplary embodiment, the branched (meth)acrylic copolymer may have a weight average molecular weight of about 1,000,000 to about 2,500,000.

The thermoplastic resin composition may include the branched (meth)acrylic copolymer resin (B) in an amount of more than about 0 but not more than about 80% by weight, for example about 5 to about 70% by weight, as another example about 10 to about 50% by weight, and as another example about 10 to about 40% by weight. In some embodiments, the thermoplastic resin composition may include the branched (meth)acrylic copolymer resin (B) in an amount of greater than about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the branched (meth)acrylic copolymer resin (B) can be in a range from about any of the foregoing amounts to about any other of the foregoing amounts. When the branched (meth)acrylic copolymer resin (B) is used in an the amount of more than about 80% by weight, mechanical properties and moldability may be deteriorated.

(C) (Meth)Acrylic Resin

The thermoplastic resin composition optionally further comprises a (meth)acrylic resin (C). The (meth)acrylic resin may be a homopolymer of a (meth)acrylic monomer, a copolymer of two or more (meth)acrylic monomers, or a mixture thereof. In addition, the (meth)acrylic resin may have a linear structure.

Examples of the (meth)acrylic monomer may include, but are not limited to, methyl methacrylate, ethyl methacrylate, n-propyl methacrylate, n-butyl methacrylate, phenyl methacrylate, benzyl methacrylate, hexyl methacrylate, cyclohexyl methacrylate, phenoxy methacrylate, phenoxy ethyl methacrylate, methyl acrylate, ethyl acrylate, propyl acrylate, butyl acrylate, 2-ethylhexyl acrylate, 2-ethylhexylmethacrylate, and the like. These (meth)acrylic monomers may be used alone or in combination with one another.

The (meth)acrylic resin (C) may be prepared by conventional methods such as bulk polymerization, emulsion polymerization, and suspension polymerization, and may be easily carried out by those skilled in the art.

Further, the (meth)acrylic resin (C) may be a homopolymer or a copolymer of (meth)acrylic monomers, or a mixture thereof.

The thermoplastic resin composition may include the (meth)acrylic resin (C) in an amount of less than about 80% by weight, for example about 5 to about 70% by weight, as another example about 10 to about 50% by weight, and as another example about 10 to about 40% by weight. In some embodiments, the (meth)acrylic resin (C) may not be present (0% by weight). In some embodiments, the (meth)acrylic resin (C) may be present, i.e., the thermoplastic resin composition may include the (meth)acrylic resin (C) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the (meth)acrylic resin (C) can be in a range from about any of the foregoing amounts to about any other of the foregoing amounts. When the (meth)acrylic resin (C) is used in an the amount of more than about 80% by weight, good mechanical properties may not be obtained.

Generally, problems of low colorability and appearance may occur when a polycarbonate resin and a (meth)acrylic resin are blended in a ratio range of about 20 to about 80: about 80 to about 20 parts by weight, due to their low compatibility. Thus it can be important to improve compatibility of a polycarbonate resin and a (meth)acrylic resin when combined in an amount within this ratio range.

Copolymer particles having a branched structure (B) can prevent phase separation between the polycarbonate resin (A) and the (meth)acrylate resin (C). Further, in the melting state, the phase separation may be minimized due to a decrease in viscosity so that compatibility between these heterogeneous resins may be improved.

In addition, when a mixture of the methacrylic copolymer with high refractive index (B) and the (meth)acrylic resin (C) is blended with the polycarbonate resin, the difference between the refractive index of the (meth)acrylic resin (C) and the refractive index of the polycarbonate may be lowered due to the increased refractive index of the methacrylic copolymer resin (B). Therefore, it is possible to improve compatibility and transparency by preventing the deterioration of transparency and colorability usually occurring in a conventional mixture of a (meth)acrylic resin and a polycarbonate resin due to the difference between the refractive index of the two resins. In addition, it is possible to prepare a resin composition having high transparency and colorability by improving scratch resistance in a conventional polycarbonate resin.

The thermoplastic resin composition may have improved compatibility by lowering complex viscosity. In an exemplary embodiment, the thermoplastic resin composition may have a complex viscosity ($\eta^*$) of about 1,000 Pas to about 10,000 Pas at 240° C. and 0.1 rad/s. In another exemplary embodiment, the thermoplastic resin composition may have a complex viscosity ($\eta^*$) of about 1,000 Pas to about 5,000 Pas at 240° C. and 0.1 rad/s. In another embodiment, the complex viscosity may be about 5,500 Pas to about 10,000 Pas. Furthermore, at 240° C., the ratio of $\eta^*(0.1\ rad/s)/\eta^*(100\ rad/s)$ can range from about 3.0 to about 100.0. When the complex viscosity is outside of the above ranges, compatibility may be deteriorated due to phase separation. In an exemplary embodiment, the ratio of $\eta^*(0.1\ rad/s)/\eta^*(100\ rad/s)$ can range from about 3.5 to about 30.0. In another exemplary embodiment, the ratio of $\eta^*(0.1\ rad/s)/\eta^*(100\ rad/s)$ can range from about 30.0 to about 75.0. In another exemplary embodiment, the ratio of $\eta^*(0.1\ rad/s)/\eta^*(100\ rad/s)$ can range from about 75.0 to about 100.0.

The thermoplastic resin composition may further comprise one or more additives selected as appropriate depending on the end uses and desired properties of the composition. Exemplary additives may include without limitation flame retardants, antimicrobials, releasing agents, thermal stabilizers, antioxidants, light stabilizers, compatibilizer, pigments, inorganic fillers, surfactants, nucleating agents, coupling agents, fillers, plasticizers, impact modifiers, coloring agents, stabilizers, lubricants, antistatic agents, dyes, flameproof agents, and the like. These additives may be used alone or in combination with one another. The additive(s) may be used in conventional amounts, such as about 0.01 to about 20 parts by weight, per 100 parts by weight of the polycarbonate resin (A), the branched (meth)acrylic copolymer resin (B), and the (meth)acrylic resin (C).

The present invention provides a molded article produced from the foregoing thermoplastic resin composition. The molded article can have a total light transmittance of about 8 to about 50% measured by means of a Haze meter NDH 2000 manufactured by Nippon Denshoku Co. Ltd., a melt flow index of about 5 to about 15 g/10 min measured in accordance with ASTM D 1238, and a scratch width of about 210 to about 295 μm measured by a ball-type scratch profile test (BSP test).

The thermoplastic resin composition of the present invention may be prepared by conventional methods. For example, the aforementioned components and optional other additives may be mixed in a mixer together and the mixture may be melt-extruded through a conventional extruder in a pellet form, and then the resin pellets may be used to prepare plastic molded articles for example by injection and extrusion processes as known in the art.

Since the thermoplastic resin composition can have excellent scratch resistance, colorability, and transparency, the thermoplastic resin composition may be molded into various articles such as housings of electrical and electronic goods, parts of automobiles, lenses, window glasses, and the like.

In some exemplary embodiments, the scratch-resistant thermoplastic resin composition may be used in housings of electrical and electronic products such as TVs, audio sets, washing machines, cassette players, MP3 players, telephones, game devices, video players, computers, photocopiers, and the like.

In an exemplary embodiment, the scratch-resistant thermoplastic resin composition may be used for internal or external parts of automobiles such as dashboard panels, instrumental panels, door panels, quarter panels, wheel covers, and the like.

The molding methods may include, but are not limited to, extrusion, injection, or casting molding, and may be easily carried out by those skilled in the art.

The invention may be better understood by reference to the following examples which are intended for the purpose of illustration and are not to be construed as in any way limiting the scope of the present invention, which is defined in the claims appended hereto.

EXAMPLE (A) Polycarbonate Resin

Bisphenol-A linear polycarbonate with a weight average molecular weight of 25,000 (Mw) manufactured by Teijin Chemicals Ltd. of Japan (product name: PANLITE L-1250 WP) is used.

(B) Branched Acrylic Copolymer Resin (B1) Branched Acrylic Copolymer Resin-1

The branched copolymer resin is prepared by conventional suspension polymerization of 57 parts by weight of methylmethacrylate monomer, 40 parts by weight of phenoxy ethyl methacrylate and 3 parts by weight of divinyltetramethyldisiloxane. The resulting copolymer has a refractive index of 1.510 and a weight average molecular weight of 2,000,000 g/mol.

(B2) Branched Acrylic Copolymer Resin-2

The branched copolymer resin is prepared by conventional suspension polymerization of 27 parts by weight of methylmethacrylate monomer, 70 parts by weight of phenoxy ethyl methacrylate and 3 parts by weight of divinyltetramethyldisiloxane. The resulting copolymer has a refractive index of 1.530 and a weight average molecular weight of 2,000,000 g/mol.

(B3) Branched Acrylic Copolymer Resin-3

The branched copolymer resin is prepared by conventional suspension polymerization of 47 parts by weight of methylmethacrylate monomer, 50 parts by weight of phenoxy ethyl methacrylate and 3 parts by weight of divinyltetramethyldisiloxane. The resulting copolymer has a refractive index of 1.530 and a weight average molecular weight of 2,000,000 g/mol.

(B4) Branched Acrylic Copolymer Resin-4

The branched copolymer resin is prepared by conventional suspension polymerization of 17 parts by weight of methylmethacrylate monomer, 40 parts by weight of phenoxy ethyl methacrylate, 40 parts by weight of cyclohexyl methacrylate, and 3 parts by weight of divinyltetramethyldisiloxane. The resulting copolymer has a refractive index of 1.530 and a weight average molecular weight of 2,000,000 g/mol.

(C) (Meth)Acrylic Resin

Polymethylmethacrylate resin with a weight average molecular weight of 92,000 (Mw) manufactured by LG MMA Ltd. of South Korea (product name: L84) is used.

Examples 1~6 and Comparative Examples 1~3

The components as shown in Table 1 and a MBS-based impact modifier are added to a conventional mixer, and the mixture is extruded through a conventional twin screw extruder (L/D=29, φ=45 mm) to prepare a product in pellet form. The pellets are dried at 80° C. for 6 hours and then molded into test specimens in a 6 oz injection molding machine.

The compatibility and the transparency of the test specimens are estimated by measuring flow mark, transparency, color and transmittance. The flow mark, transparency and color appearing on the test specimens are measured by the naked eye. The improved compatibility is confirmed by phase separation behavior through TEM images. Test specimens with dimensions of L 90 mm×W 50 mm×T 2.5 mm are used for measuring the above appearance properties.

The total light transmittance is measured using a Haze meter NDH 2000 manufactured by Nippon Denshoku, and calculated by adding diffuse light transmittance (DF) and parallel transmittance (PT). It can be estimated that the higher total light transmittance is, the better transparency is.

The melt flow index of the test specimens is measured in accordance with ASTM D 1238 at 220° C. using a balance weight of 10 kg.

The scratch resistance is measured by a ball-type scratch profile (BSP) test. The BSP test is conducted by applying a scratch of a length of 10~20 mm onto resin specimens with dimensions of L 90 mm×W 50 mm×T 2.5 mm at a load of 1,000 g and a scratch speed of 75 mm/min, using a metal spherical tip with a diameter of 0.7 mm and measuring a profile of the applied scratch using a surface profile analyzer (XP-I) manufactured by Ambios Corporation which provides a scratch profile through surface scanning using a metal stylus tip with a diameter of 2 μm. The scratch resistance is evaluated based on the scratch width of the measured profile.

Figure 1A:
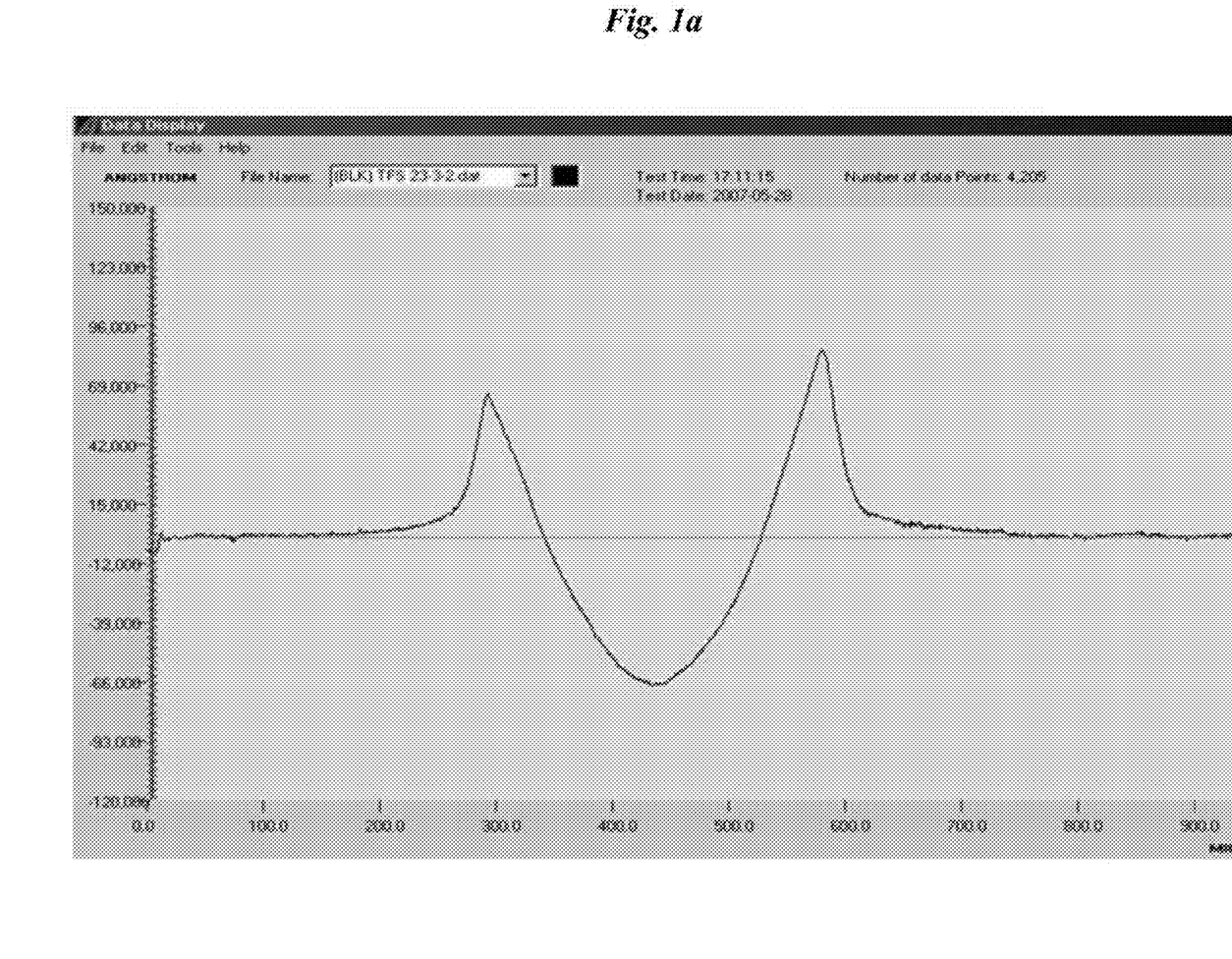
Figure 1B:
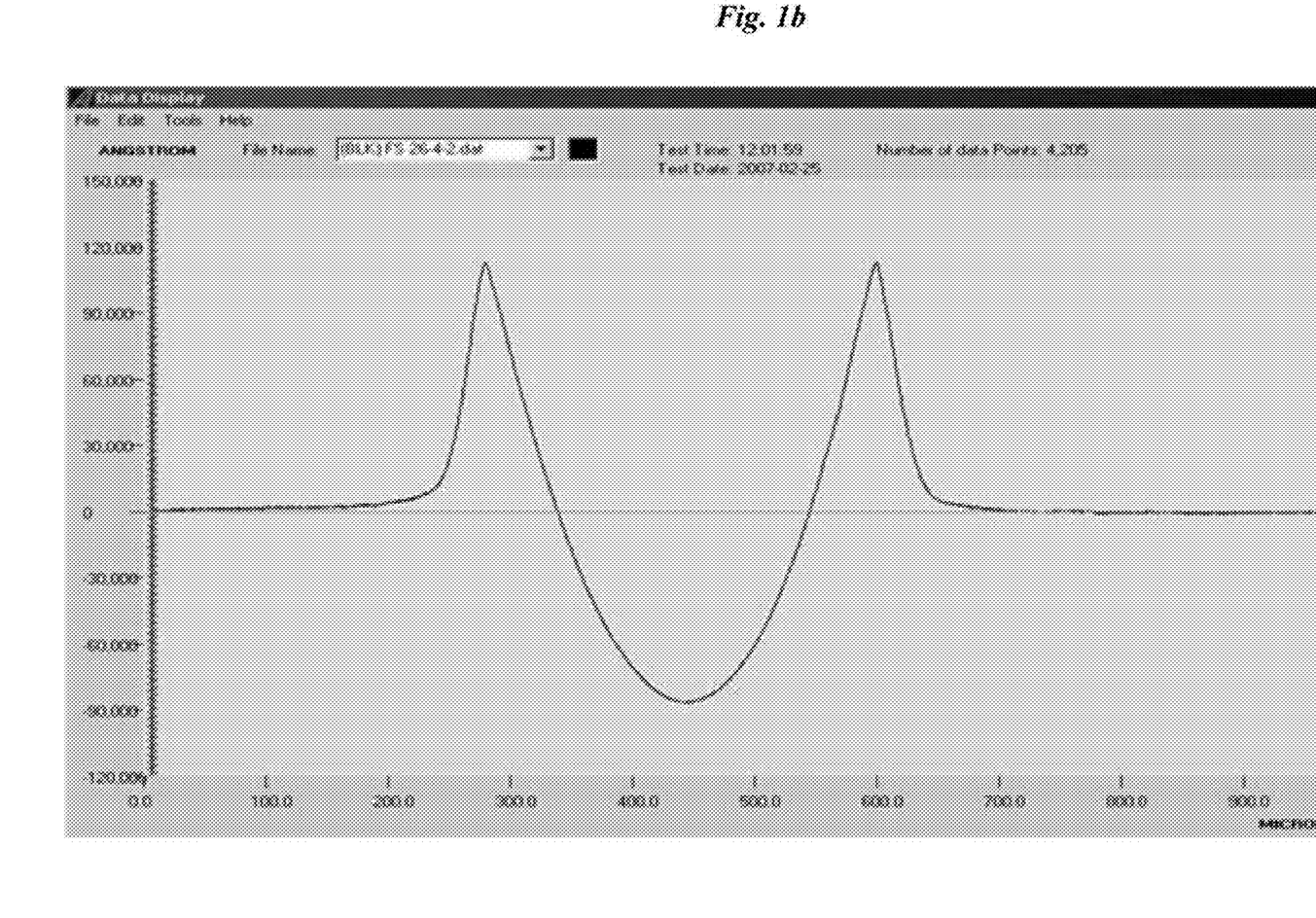

FIG. 1(a) illustrates a scratch profile picture of a test specimen prepared in Example 2 measured by the BSP test, and FIG. 1(b) illustrates a scratch profile picture of a test specimen prepared in Comparative Example 3. The results of scratch width are shown in the following Table 1.

Figure 2:
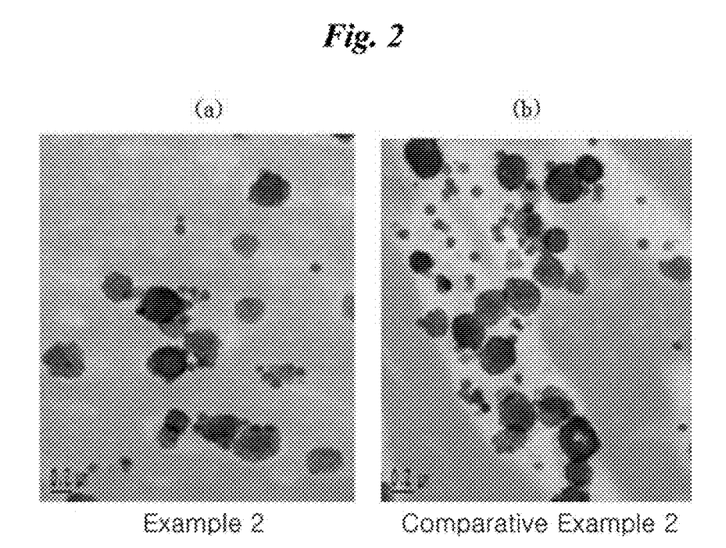

To analyze phase behavior, TEM images of resin compositions of Example 2 and Comparative Example 2 are shown in FIGS. 2(a) and 2(b), respectively.

Figure 3:
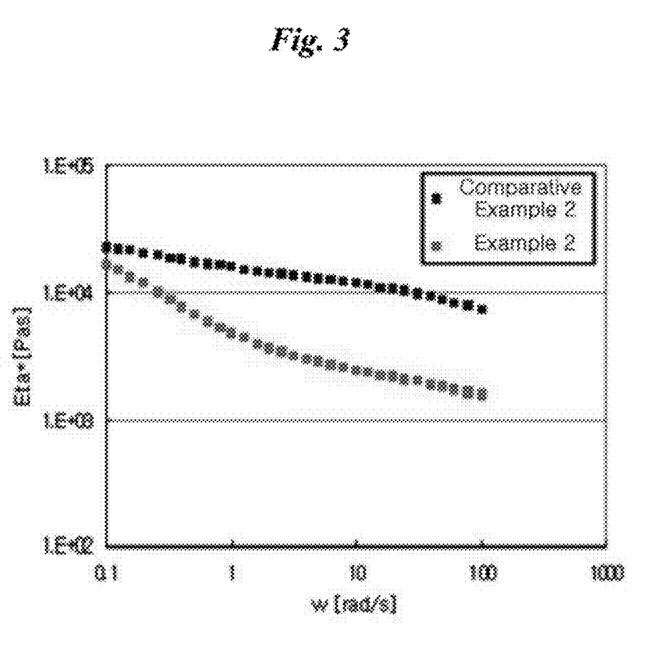
FIG. 3 is a graph comparing viscosity behavior of a specimen prepared in Example 2 with viscosity behavior of a specimen prepared in Comparative Example 2.

The viscosity behaviors of resin compositions of Example 2 and Comparative Example 2 are measured by ARES (Advanced Rheometric Expansion System) manufactured by Rheometric Scientific Corporation at 240° C., and the results are shown in FIG. 3.

TABLE 1

|  | Examples | | | | | | Comparative Examples | | |
| --- | --- | --- | --- | --- | --- | --- | --- | --- | --- |
|  | 1 | 2 | 3 | 4 | 5 | 6 | 1 | 2 | 3 |
| (A) | 70 | 70 | 70 | 50 | 70 | 70 | 50 | 70 | 100 |
| (B1) | 15 | — | — | — | — | — | — | — | — |
| (B2) | — | 15 | 30 | 25 | — | — | — | — | — |
| (B3) | — | — | — | — | 15 | — | — | — | — |
| (B4) | — | — | — | — | — | 15 | — | — | — |
| (C) | 15 | 15 | — | 25 | 15 | 15 | 50 | 30 | — |
| Flow Mark | X | X | X | X | X | X | ○ | ○ | X |
| Transparency and color | Translucent | Translucent | Translucent | Translucent | Translucent | Translucent | Opaque milky | Opaque milky | Transparent |
| Total light transmittance (TT) | 15.42 | 25.82 | 30.03 | 9.89 | 26.30 | 23.07 | 5.11 | 9.47 | 64.77 |
| Melt Flow Index (MI) | 5.13 | 6.75 | 9.71 | 7.77 | 5.03 | 8.14 | 4.56 | 4.44 | — (*) |
| BSP Width (μm) | 288 | 288 | 292 | 268 | 287 | 289 | 269 | 290 | 345 |

(*): impossible to obtain the result of Melt flow index of Comparative Example 3 in the above conditions.

As shown in Table 1, when the polycarbonate, (meth) acrylic resin and the branched acrylic copolymer resin are blended, improved scratch resistance is exhibited, compared to using only the polycarbonate as in Comparative Example 3, which is also confirmed by the scratch profile of FIG. 1.

Comparative Examples 1 and 2 which do not include the branched acrylic copolymer resin (B) have a flow mark and opaque milky appearance due to low compatibility between the two resins. Examples 1 to 6 using the branched acrylic copolymer (B) exhibit better transparency and flow mark and high total light transmittance, compared to Comparative Examples 1 to 2. Furthermore, Example 2 and Example 5 including two different branched copolymers which have the same refractive index, but are prepared using different amounts of acrylic monomer exhibit similar levels of transparency and flow mark. Also, Example 6 using two different acrylic monomers which have a high refractive index exhibits similar results.

Without being bound by any explanation or theory of the invention, it is currently believed that the improved compatibility is caused by the control of refractive index and the minimization of phase separation, and the result of complex viscosity of the composition is confirmed through the results of ARES. As shown in FIG. 3, the complex viscosity measured by ARES shows a tendency to decrease, as the frequency (rad/s) increases from 0.1 to 100, and Example 2 exhibits a more significant decrease than Comparative Example 2.

Furthermore, when two similar branched acrylic copolymers are used, Example 2 including the branched acrylic copolymer with a high refractive index exhibits better transparency and compatibility and high total light transmittance, as compared to Example 1.

The improved compatibility between polycarbonate and polymethylmethacrylate in the compositions of the invention is also confirmed by the TEM images of FIGS. 2(a) and (b). FIG. 2(b) illustrates that Comparative Example 2 exhibits that the polymethylmethacrylate has a continuous phase and large domain in a polycarbonate base due to lowered compatibility, and FIG. 2(a) illustrates that Example 2 exhibits improved compatibility since the phase size of polymethylmethacrylate decreases and spherical phase behavior is shown.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:

(A) about 20 or more but less than about 100% by weight of a polycarbonate resin; and

(B) more than about 0 but not more than about 80% by weight of a branched (meth)acrylic copolymer resin, wherein said branched (meth)acrylic copolymer resin (B) is a copolymer consisting of (b1) about 5 to about 99.999% by weight of an aromatic methacrylate, an aliphatic methacrylate, or a mixture thereof represented by the following Chemical Formula 1, Chemical Formula 2, or a mixture thereof; (b2) about 0 to about 85% by weight of a mono-functional unsaturated monomer selected from the group consisting of methacrylic acid ester monomers, acrylic acid ester monomers, unsaturated carboxylic acid monomers, acid anhydride monomers, hydroxyl group containing ester monomers, and mixtures thereof, and (b3) about 0.001 to about 10% by weight of a branch-inducing monomer, or a mixture of copolymers thereof:

Chemical Formula 1 wherein m is an integer from 0 to 10, and X comprises a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group;

Chemical Formula 2 wherein m is an integer from 0 to 10, Y is oxygen (O) or sulfur (S), and comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

2. The thermoplastic resin composition of claim 1, wherein said branched (meth)acrylic copolymer resin (B) has a weight average molecular weight of about 100,000 to about 3,500,000.

3. The thermoplastic resin composition of claim 1, wherein said branched (meth)acrylic copolymer resin (B) has a refractive index of about 1.495 to about 1.575.

4. The thermoplastic resin composition of claim 1, wherein said aromatic methacrylate, aliphatic methacrylate, or mixture thereof (b1) comprises cyclohexyl methacrylate, phenoxy methacrylate, phenoxyethyl methacrylate, 2-ethylthiophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl) ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, or a mixture thereof.

5. The thermoplastic resin composition of claim 1, wherein said methacrylic acid ester monomer comprises methyl methacrylate, ethyl methacrylate, n-propyl methacrylate, n-butyl methacrylate, hexyl methacrylate, 2-ethylhexyl methacrylate or a mixture thereof; said acrylic acid ester monomer comprises methyl acrylate, ethyl acrylate, propyl acrylate, butyl acrylate, hexyl acrylate, 2-ethyl hexyl acrylate or a mixture thereof; said unsaturated carboxylic acid monomer comprises acrylic acid, methacrylic acid, or a mixture thereof; said acid anhydride monomer comprises maleic anhydride; and said hydroxyl group containing ester monomer comprises 2-hydroxyethyl acrylate, 2-hydroxypropyl acrylate, monoglycerol acrylate or a mixture thereof.

6. The thermoplastic resin composition of claim 1, wherein said branched (meth)acrylic copolymer resin (B) is a copolymer consisting of (b1) said aromatic methacrylate, aliphatic methacrylate, or mixture thereof, (b2) said mono-functional unsaturated monomer, and (b3) said branch-inducing monomer or mixture of copolymers thereof, wherein said branch-inducing monomer (b3) comprises a silane or siloxane compound.

7. The thermoplastic resin composition of claim 1, wherein said branch-inducing monomer (b3) comprises at least one monomer comprising a silane or siloxane compound; aromatic crosslinking monomer; vinyl group-containing monomer; allyl compound; (poly)alkylene glycol di(meth)acrylate compound; or a mixture thereof.

8. The thermoplastic resin composition of claim 7, wherein said silane or siloxane compound comprises an unsaturated hydrocarbon group-containing silicone-containing crosslinking monomer; said aromatic crosslinking monomer comprises divinylbenzene; said vinyl group-containing monomer comprises 1,4-divinyloxybutane, divinylsulfone, or a mixture thereof; said allyl compound comprises diallyl phthalate, diallylacrylamide, triallyl (iso)cyanurate, triallyl trimelitate, or a mixture thereof; and said (poly)alkylene glycol di(meth)acrylate compound comprises 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate, or a mixture thereof.

9. The thermoplastic resin composition of claim 1, further comprising one or more additives selected from the group consisting of flame retardants, antimicrobials, releasing agents, thermal stabilizers, antioxidants, light stabilizers, compatibilizer, dyes, inorganic fillers, surfactants, nucleating agents, coupling agents, fillers, plasticizers, impact modifiers, coloring agents, stabilizers, lubricants, antistatic agents, pigments, flameproof agents, and mixtures thereof.

10. The thermoplastic resin composition of claim 9, wherein said thermoplastic resin composition has a complex viscosity ($\eta^*$) of about 1,000 Pas to about 10,000 Pas at 240° C. and 0.1 rad/s, and the ratio of $\eta^*(0.1\ rad/s)/\eta^*(100\ rad/s)$ ranges from about 3.0 to about 100.0 at 240° C.

11. The thermoplastic resin composition of claim 1, wherein said thermoplastic resin composition further comprises (C) more than about 0 but less than about 80% by weight of (meth)acrylic resin.

12. The thermoplastic resin composition of claim 11, wherein said (meth)acrylic resin (C) has a linear structure.

13. The thermoplastic resin composition of claim 12, wherein said (meth)acrylic resin (C) comprises a homopolymer of a (meth)acrylic monomer, a copolymer of (meth)acrylic monomers, or a mixture thereof.

14. The thermoplastic resin composition of claim 13, wherein the (meth)acrylic monomer (C) comprises methyl methacrylate, ethyl methacrylate, n-propyl methacrylate, n-butyl methacrylate, phenyl methacrylate, benzyl methacrylate, hexyl methacrylate, cyclohexyl methacrylate, phenoxy methacrylate, phenoxy ethyl methacrylate, methyl acrylate, ethyl acrylate, propyl acrylate, butyl acrylate, 2-ethylhexyl acrylate, 2-ethylhexylmethacrylate, or a mixture thereof.

* * * * *